(12) United States Patent
Wielinga

(10) Patent No.: US 6,664,381 B1
(45) Date of Patent: *Dec. 16, 2003

(54) PROCESS FOR PRODUCING PURE GUARSEED FLOUR

(75) Inventor: Willem Cor Wielinga, Tägerwilen (CH)

(73) Assignee: Meyhall AG, Kreuzlingen (CH)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/043,757

(22) PCT Filed: Sep. 25, 1996

(86) PCT No.: PCT/CH96/00333
§ 371 (c)(1),
(2), (4) Date: Mar. 25, 1998

(87) PCT Pub. No.: WO97/11974
PCT Pub. Date: Apr. 3, 1997

(30) Foreign Application Priority Data

Sep. 28, 1995 (CH) .............................. 2743/95

(51) Int. Cl.⁷ .............................. C08B 37/00
(52) U.S. Cl. .................. 536/4.1; 536/1.11; 426/622; 426/615
(58) Field of Search .................. 426/622, 615, 426/578; 536/52, 1.11, 1.4, 123.1, 4.1

(56) References Cited

U.S. PATENT DOCUMENTS

| | | | | | |
|---|---|---|---|---|---|
| 3,132,681 A | * | 5/1964 | Keen et al. | ............... | 146/221.8 |
| 3,740,389 A | * | 6/1973 | Nordgren | ..................... | 260/209 |
| 3,912,713 A | * | 10/1975 | Boonstra et al. | ............. | 260/209 |
| 4,011,393 A | * | 3/1977 | Trapasso | ..................... | 536/114 |
| 4,169,945 A | * | 10/1979 | DeGuia et al. | ............. | 536/114 |
| 4,435,429 A | * | 3/1984 | Burrows et al. | ............... | 426/18 |
| 4,659,811 A | * | 4/1987 | Wu | ........................... | 536/114 |
| 5,536,825 A | * | 7/1996 | Yeh et al. | ..................... | 536/52 |

* cited by examiner

*Primary Examiner*—James O. Wilson
*Assistant Examiner*—Ganapathy Krishnan
(74) *Attorney, Agent, or Firm*—Stroock & Stroock & Lavan LLP

(57) ABSTRACT

The object of the present invention is a process for producing pure guarseed flour which produces a transparent and highly viscous solution when dissolved in water. Despite extensive purification, the process provides good yields of pure guarseed flour. The process comprises acid treatment of the initial material, washing the acid-treated split with water and/or neutralization with an aqueous alkaline solution, washing with water and dewatering using an aqueous alcohol solution. Transparent, highly viscous solutions of pure guarseed flour obtained by this process are primarily used in the food industry.

12 Claims, No Drawings

PROCESS FOR PRODUCING PURE GUARSEED FLOUR

BACKGROUND OF THE INVENTION

The object of the present invention is a process for producing guarseed flour which, when it is dissolved in water, produces a transparent solution of high viscosity, where the process produces good yields of the pure flour despite extensive cleaning. Transparent, high-viscosity solutions of pure guarseed flour are of great importance primarily in the food industry.

Guarseed flour is used as a thickening agent in the textile and explosives sectors, as a binding agent in the paper industry, as a flocculant in ore extraction and as an auxiliary material in the extraction of natural gas and oil, in the pharmaceutical and cosmetic fields, and as a thickener, emulsifier and (co-)stabilizer in the areas of foods and food technology.

In pharmaceutics guarseed flour is used for example for spray embedding of vitamins, in order to increase their shelf stability. In addition, the use of guarseed flour in sprays guarantees nearly monomolecular distribution of the active ingredients and consequently improved, uniform resorption, which is desirable in the case of asthma medications and various allergy remedies. Because of the extremely low protein content of the pure guarseed flour there is no danger of the development of an allergic reaction to a medication which contains this substance. Additional applications in this field are the formulation of delayed-action tablets and as a means of lowering the cholesterol level. In the field of medicine guarseed flour is also used as an emulsifier and stabilizer in contrast agents.

Among other applications, guarseed flour has also proven to be an ideal dietetic substance, since its building blocks, the so-called galactomannans, are not attacked by human stomach and intestinal enzymes. This is to be expected, since in the human digestive system up to the large intestine there are neither $\beta$-mannanases nor $\alpha$-glacto-sidases present, which would be necessary to break down these building blocks. Since the building blocks of guarseed flour do not enter into the human metabolism, there is no reason to regard guarseed flour as a carrier or supplier of calories. Since guarseed flour is constituted of completely neutral polysaccharides, or more precisely of galactomannans, which have neither uronic acid nor other ionogenic groups, they represent a completely harmless material in physiological terms.

An additional advantage in terms of its use as an ingredient in foods is its complete neutrality of taste. It is used in reduced-calorie or reduced-fat foods or drinks which are often perceived as "thin" by the consumer. Adding guarseed flour to these products lends them a "creamier" consistency. In the production of fruit juices guarseed flour is used in order to re-suspend the fruit pulp uniformly, in puddings and cremes it functions as a thickener, in ice creams, milkshakes, mousses and similar products it works as a stabilizer. With traditional guarseed flour preparations, only mild molecular interaction with the biopolymer xanthane was found. While mixing these two colloids did produce a synergistic increase in viscosity, a specific formation of gel as in the case of carubin, carob seed flour and xanthane, did not occur. If a 1:1 mixture of the guarseed flour in accordance with the invention and xanthane is heated together and allowed to cool at 4° C. (refrigerator temperature), a gel forms. An advantage of this combination of guarseed flour and xanthane lies in the fact that the gel from these two components melts at body temperature, so that it is superbly suited for the production of gelatin-like foods, as a vehicle for the delivery of medications in pill form, and the like. Furthermore, guarseed flour and xanthane are used in combination as co-stabilizers in the production of salad dressings, since this combination, in contrast to guarseed flour used alone, is resistant to acids.

Guarseed flour is obtained from the endosperm of the guar bean (*cyamopsis tetragonobolus*). Guarseed flour consists in large measure of galactomannans, i.e. of polysaccharides whose fundamental chain is linked in the 1→4 direction by $\beta$-glycoside bonds and is made up of mannose which is joined to galactose via primary OH groups. The ratio of unsubstituted mannose to mannose substituted with galactose is about 2:1, with the substituted units not alternating strictly but arranged in the polygalactommannan molecules in groups of two or three. The guar-galactomannans form highly viscous solutions in water even in slight concentrations. Acueous solutions of 1 percent by weight of common commercial guarseed flour produce viscosities of around 3000 to 6000 mPa·s.

Guar-galactomannans are divided into cold water soluble, hot water soluble and insoluble galactomannans on the basis of chemical and physiochemical differences.

To obtain and purify the guarseed flour the guarseed is treated mechanically; this produces approximately 35 parts unrefined guar endosperm halves and approximately 60 parts guar germ flour. The guar germ flour consists primarily of the germ of the seed, the scraped off bean skin, and small pieces of the endosperm. The endosperm completely encloses the germ and is in turn surrounded by the seed skin. A protein-rich, aleuron-like cell layer encloses the endosperm, whose cells are closely interlocked with the endosperm. This protein-rich layer adjoins the seed skin.

The unrefined endosperm halves can be further cleaned mechanically and produce splits of varying quality in terms of their protein content, their components which cannot by hydrolyzed by acid (A.I.R.) and the amount of skin present. The term "split," which is usual among the specialists, is synonymous with the term "endosperm halves."

Although guarseed flour is already in wide use as a thickening agent, there is a desire to improve its purity and, related thereto, its physical and physiological properties. For its use in foods, in particular, the purity of the guarseed flour is of great importance. Also desirable is more complete utilization of the main components of the endosperm, so that the latter can be used to a greater degree in the corresponding branches of industry in place of cellulose derivatives or other polysaccharides which are clearly soluble in water, or synthetic polymers which are clearly soluble in water.

If the products consisting of pure guarseed flour which are currently available on the market, when processed into flour, are dissolved in water at 25° C. or at 86 to 89° C. for 10 minutes, they produce cloudy solutions. If the insoluble material in these solutions is centrifuged out at high centrifugal forces (>35,000×g), it turns out that 23–35% of the guarseed flour comprises material which is centrifuged out. Microscopic investigations have shown that the centrifuged precipitate is made up primarily of skin fragments, protein materials, insoluble peripheral cells, intact unopened cells of the inner endosperm and other impurities of the seeds or splits. Chemical derivatization of the guarseed flour (etherification, hydroxypropylation, cationization, etc.) makes it possible to produce products with significantly improved dissolving behavior in water, and along with that, greater transparency of the solutions.

One of the processes used heretofore for obtaining pure guarseed flour uses chlorinated solvents, such as trichlorethylene (see EP 0 130 946, Meyhall Chemical AG). The solution was fractionated by simply being left to stand or by centrifuging, which led to the formation of a protein-rich fraction (floating fraction) and the separation of a protein-poor fraction (precipitating fraction).

It has been possible to show that the highest floating fraction of endosperm processed into flour, such as guar CSA 200/50, can contain up to 25% proteins, and the precipitating fraction, which makes up 75% of the pure flour, contains about 1.5 to 1.6% protein. The precipitating fraction is used for example to produce cationic derivatives, which can be dissolved to produce clear aqueous solutions. A disadvantage of this process is that finely-ground skin fragments are also found in the precipitating fraction. An additional disadvantage is the use of halogenated solvents, since a specific weight of 1.47 to 1.48 kg/l is required. Proteins have a density of 1.3 kg/l and the galactomannans a density of 1.5 to 1.55 kg/l depending upon their moisture content. The guarseed flour produced by the process described here is suited primarily for technical applications. In food preparation this guarseed flour is probably not usable, since remnants of the halogenated solvent which was used remain in the end product; 10 ppb are found in fractions extracted with ethanol. Halogenated solvents are toxic and caustic to varying degrees, and frequently possess allergizing properties. This process should be avoided for environmental reasons as well.

An additional process for producing pure guarseed flour was proposed as early as 1969. It comprised an alkali treatment of pre-swollen splits at elevated temperatures, in which 100 parts of alkali were absorbed by 100 parts of SPS. The large quantity of alkali, i.e. NaOH, had to be washed out. This was carried out with cold water at a proportion of 1:80 (SPS:$H_2O$) and in a water extraction step with isopropanol (IPA), in which at the same time the residual NaOH in the purified splits was neutralized with acetic acid.

After grinding, a pure guarseed flour of high quality was obtained in a yield rate of 60–70%, based on the raw material SPS (simply purified splits). In 1969 this process was improved by Stein, Hall & Co., Long Island City, N.Y. The present washing process with water is based on that process. The purpose of this process for purifying guar derivatives is to remove skin fragments and peripheral cell layers, and also to remove byproducts of the various etherification reactions (hydroxypropylation, carboxymethylation and cationization and/or combinations of these).

Despite the intensive purification processes described above, it has not yet been possible to obtain in an economical way pure, non-derivatized guarseed flour which produces a clear aqueous solution with high viscosity whale at the same time delivering good yields.

The disadvantages of the processes used to date for purifying and obtaining pure guarseed flour are:

1. large losses of valuable portions of the endosperm during the mechanical cleaning, and resultant small yields of pure guarseed flour in proportion to the source material;
2. skin fragments which continue to be found on the splits of varying quality, and which interfere with the functioning of the modified end products to a large extent;
3. peripheral, protein-rich cells of the aleuron layer which hardly swell in water and which likewise have a negative influence on the functioning of the end product;
4. presence of other impurities from the guarseeds, such as woody particles, which should not be present.

It was desired, therefore, to develop a process for producing pure guarseed flour which would eliminate the aforementioned disadvantages and deliver good yields of pure guarseed flour which, after dispersion in water, would produce a clear, highly viscous solution, to be used primarily for example in the food industry, the pharmaceutical and paint industries, and in the extraction of oil.

SUMMARY OF THE INVENTION

The objective of the present invention is to fulfill the aforementioned requirements, i.e. to obtain good yields of pure guarseed flour through a new production process, especially guarseed flour suitable for the food industry, which produces clear aqueous solutions of high viscosity.

The process according to the invention for producing pure guarseed flour is defined in patent claim 1, and comprises the following stages:

(a) treatment of guar splits with acid;
(b) one-time or repeated washing of the acid-treated splits with water and/or neutralization with an aqueous alkaline solution;
(c) treatment of the splits with an aqueous alkaline solution;
(d) washing the splits with water;
(e) extraction of the water from the splits with an acueous alcohol solution.

DETAILED DESCRIPTION OF THE INVENTION

A first prerequisite for obtaining pure guarseed flour is to improve the starting material, the so-called splits. The splits, covered with skins, should constitute up to 42.5% of the seed by weight. The overlapping skin-endosperm portions, which amount to 13.5 percent of the seed by weight, are essentially insoluble in water. The embryo of the seed makes up the remaining 44%. These quantity indications show that the theoretical yield of splits usable for the invention, without skin and without overlapping parts, is 32%.

The pure guarseed flour according to the invention can be produced most advantageously from splits which have a protein content of 4.2% and an A.I.R. proportion of 1.8%.

Pure guarseed flour, whose source material according to the invention preferably consists of splits of the highest purity available at the time, can be produced after acid treatment using 70% to 96%, preferably 96%, sulfuric acid (8% to 12% based on the weight of the split) at room temperature or elevated temperatures. If the concentration of the sulfuric acid is lower than 70% by weight, then smaller yields of pure guar products are produced, and in addition with lower viscosities.

The order of the various steps of treatment after the acid treatment can be varied, which causes the resulting guarseed flour to acquire differing properties in terms of its viscosity, translucency, protein and A.I.R. content. For example, the order of the handling steps can be chosen from the following technical sequences, to name just a few possibilities:

1. washing—alkaline treatment—washing—water extraction and neutralization as needed, preferably with an organic acid—drying and/or grinding
2. neutralization of the acid-treated splits—washing—alkaline treatment—washing—water extraction and neutralization as needed, preferably with an organic acid—drying and/or grinding Dehydration with isopropyl alcohol or some other alcohol such as methanol, ethanol, N-propyl alcohol, N-butyl alcohol or equivalent is an absolute "must," if good products are to be produced. Treatment with IPA improves the clarity of the aqueous guarseed flour solutions. If appropriate, at the same time as the IPA treatment a neutralization with 99% acetic acid or some other so-called food acid such as citric acid, tartaric acid, formic acid or equivalent can be performed.

The level of moisture during the grinding significantly influences the properties of the mealy end product. The higher the moisture content in a technically practicable dimension, the larger is the quantity of the soluble polysaccharides, i.e. the higher is the yield of active galactomannans. This can be explained by the enlargement of the cell volume due to the high degree of moistening. During the grinding the swollen cells are forced through a defined opening or crack, which can cause the cell membrane to tear, assuming that the swollen particles are significantly larger than the openings (the elasticity of the cells also plays an important role). When solutions in water are produced the galactomannans are released from the cells which have thus been destroyed, which is not the case with cells which have not been destroyed. In these cases the galactomannans remain within the intact cells and do not contribute effectively to the viscosity of the solution.

A moisture content of approximately 72% to 75% when grinding is acceptable for practical and technical reasons. Moisture levels lower than 72% when grinding lower the quality of the guarseed flour. A higher content does not offer any advantages.

An advantage of the present invention consists in the possibility of producing products for solutions with viscosities for example as low as 45 mPa·s, and those with up to 9000 to 10000 mPa·s at 1% concentration in water at 25° C.

An additional advantage of the invention consists in producing pure guar products whose protein content is as low as 0.2 to 0.5.

The yield of pure guarseed flour varies between 70% and 80%.

Adding borax during the alkaline treatment or during a washing step makes the purifying process significantly easier. Excessive moistening or swelling can be prevented by 0.05% borax, based on the weight of the source split. The end product is unsuitable for use in foods after addition of borax, however, since traces of borax (approximately 20 ppm) remain in the end product.

Derivatization of the galactomannans in the guarseed flour is a significant factor in the latter's solubility in cold water. Through derivatization (e.g. carboxymethylation, hydroxypropylation and the like) one or more non-ionic, anionic or cationic groups are added, causing the galactomannans which are soluble in hot water to become coldwater soluble. The derivatization usually takes place immediately following the cleaning. As in the case of the addition of borax, as mentioned above, the use of derivatized guarseed flour is not allowed in the food industry. Derivatized guarseed flour, especially guarseed flour which is derivatized by cation activation, does however find use in such cosmetic products for instance as hair conditioner, body lotions and similar products.

The material resulting from the present invention is especially advantageous, in that when dissolved in water it yields solutions of great clarity. A 1% solution (0.9% dry substance) of the pure guarseed flour produced with this process shows a viscosity of 9000 to 10000 mPa·s at 25° C., when such solutions are produced in a household mixer using hot water at 90 to 100° C. The very high-viscosity products have a protein and an A.I.R. content of only 0.2 to 0.6%. Through selection of the necessary processing steps (acid treatment, washing with water, treatment with IPA), an aqueous solution with a transparency of up to 94% can be achieved. A 0.5% solution of the pure guarseed flour with extremely high viscosity at a wavelength of 500 nm with a 1 cm cuvette at 25° C. shows a clarity of 74 to 81%, whereas untreated split solutions which have been produced at the same concentration and temperature show a translucency of 46 to 48%. The comparable clarity of solutions of the precipitating fraction mentioned earlier, obtained by fractioning ground guar products in halogenated or fluorinated hydrocarbon, is around 56%. The viscosity was determined in a Brookfield RVT viscometer, the transparency of the solutions in a photospectrometer.

The invention will be explained in the following section on the basis of several examples. Splits of the highest quality were used as the source material for the described examples. Data such as the quantity of NaOH used for the neutralization, washing proportions, protein content and viscosity may be obtained from the corresponding tables.

EXAMPLE I

Treatment of the Splits With Concentrated Sulfuric Acid at Room Temperature, Followed by a Neutralization and Washing Step At the beginning of the cleaning it became clear that the concentrated sulfuric acid being used was not penetrating into the skin fragments which were still connected to the endosperm halves. This was preventing the underlying peripheral layers from being treated as desired.

In the course of this first series of trials (Trials 1 to 12, Table I) it was possible to reduce the protein content from 4% to 1.4%. This shows that most of the acid-treated layers were removed during the alkaline washing step to neutralize the acid.

The splits were weighed in a beaker and the necessary quantity of sulfuric acid was quickly added. The mixture was stirred thoroughly with a plastic spatula.

During the acid treatment the splits were repeatedly mixed. Then alkaline wash water was added and the slurry was stirred for 5 to 10 minutes. The splits thus treated were recovered by filtration and, if necessary, washed again. The weight of the filtrates was recorded. The cleaned splits were hydrated to a moisture level of 70% before grinding by adding the missing quantity of water.

The swollen splits were ground using a Retsch table mill.

EXAMPLE II

Treatment of the Splits With Concentrated Sulfuric Acid at 960 to 103° C. for 15 to 30 Minutes and Cleaning With Alkaline Washing Water, and Additional Washing With Water The splits were mixed with the necessary quantity of sulfuric acid (10 to 15%), after being made slightly alkaline with a 0.5% NaOH solution (Table I, Trials 13 to 17). This allows monitoring of the acid distribution. Alkaline splits are yellow, and turn amber-colored after the acid treatment.

The acidic splits were placed on a glass plate and put in a hot-air oven at the requisite temperature (96° to 103° C.).

After this treatment the splits were washed, simultaneously neutralized, and washed again. The overall wash ratio was a maximum of 1:10. The remainder of the treatment was the same as described in Example 1.

It was possible to lower the protein content of the purified guarseed flour to 1.2%. The viscosity data may be found in Table IV.

EXAMPLE IIA

The splits were treated as described in Example II. In addition to the washing step with water the swollen, still alkaline splits in Trial 18 (Table I) were dehydrated with hot isopropanol (IPA) at the ratio of splits:IPA of 1:2, and neutralized with acetic acid, which caused the protein content to fall below 1%, a result which can be attributed to the additional alkaline treatment of the proteins and their partial extraction.

In Trials 19 and 20 (Table I) the quantity of sulfuric acid was reduced to 8%; a dehydration step with IPA in the ratio splits:IPA of 1:1.8 was included. The protein content of the purified guarseed flour was somewhat higher than 1% (see Table I).

EXAMPLE III
Treatment of Splits With 8% Sulfuric Acid and Alkaline Treatment Using Various Quantities of NaOH at Elevated Temperatures, Washing With Water and Dehydration The conditions and the result of the trials described below are recorded in Table II.

The splits were weighed in a beaker and the requisite quantity of sulfuric acid was added, after the splits were rendered slightly alkaline with 5% NaOH.

The hydrolysis took place for 20 minutes at 105° C., after which alkali was added for only 7 minutes at 65° to 70° C. and the mixture was stirred.

The alkaline splits were washed with water and dehydrated with IPA in the proportions 1:1.6 at 550 to 62° C., then dried in order to remove the remaining IPA. The moisture content was brought to 70% and the solits were ground.

In accordance with the process described before, 100 g of splits were first treated with 4 g of 5% NaOH. After 2 to 5 minutes the usual quantity of 8 g of 96% sulfuric acid was added and mixed as well as possible.

The quantities of acidic mixture used for Trials 23, 24, 25 and 26 vary slightly from 8 g:

No. 23: 8.1 g
No. 24: 8.56 g
No. 25: 8.28 g
No. 30: 8.04 g

The hydrolysis of the peripheral layers took place for 20 minutes at 102° to 106° C.

The acidic splits in Trials 24, 25 and 26 were washed with water (70° C.) in the proportions 1:2, 1:1.6 and 1:1.6, respectively, and then treated with NaOH.

The other trials were treated once with 30% NaOH at elevated temperatures, then washed with water and dehydrated with IPA. The alcohol was removed as thoroughly as possible with hot air. The splits were moistened up to 70% and ground in a Retsch mill (see Table II).

In Trials 27 to 32 (Table II) the temperature of the wash water after the alkali treatment was 70° C. This increase in the water temperature scarcely influenced the final viscosity (in a range of 4400 to 5750 mPa·s), whereas washing at elevated temperatures after the acid treatment caused a significant reduction in the viscosity (Trial no. 26: 1550 mPa·s).

The protein content of the purified products varied in Trials 21 to 32 between 0.67% and 1.11% (based on moisture content of 10%). In Trials 24, 25 and 26 the acid-treated splits were first washed with water and then treated with alkali, as described above. The protein content dropped to 0.7% though there is risk of the galactomannans being broken down (see Trial 26, Table II).

EXAMPLE IV
Treating the Splits With 6–11% Sulfuric Acid 96% at 105° C., Followed by a Neutralization and Washing Step and Alkali Treatment, Washing, Dehydration and Neutralization With Acetic Acid.

Table III summarizes the conditions of the trials described below. The acid-treated, neutralized splits were deproteinized with a great excess of 30% NaOH or 23% NaOH at elevated temperatures of 45°–50° C. in Trials 34 and 65 [sic!; apparently 35 is intended -Transl.], and 65°–70° C. in the remaining trials.

The alkali-treated splits were washed twice with water, dehydrated and simultaneously neutralized with 99% acetic acid in IPA. The ratio of splits to IPA was 1:1.6.

Most of the IPA still present was removed through treatment with hot air (70° C.), after which the splits were moistened up to 70% with water. After that the splits were ground in a Retsch mill.

The products, dissolved in water, exhibited viscosities and at the same time extraordinary clarity and very low protein content. The results are shown in Table VI. The products from Trial 36, for example, had as little as 0.45% protein, but contained 1–2% sodium acetate.

EXAMPLE V
Removal of the Peripheral Layers of the Splits With 8% Sulfuric Acid 96%, Followed by Neutralization or Washing and Hydrat on, an Alkali Treatment, and Washing, Dehydration and Neutralization In Trials 50 and 71–85, 100 g of splits were made neutral as usual. The splits of the other trials were first treated with the necessary quantity of sulfuric acid.

In Trials 50 and 51 the neutralized splits were treated with stoichio-metric quantities of NaOH, using NaOH solutions at concentrations of 30% and 23%, respectively. Then they were washed twice with water, in both cases in proportions of 1:2. The subsequent alkali treatment was carried out for 5 minutes at 65–70° C., after which the splits were washed twice with water in the proportions 1:3.2 and 1:8.4, respectively, then dehydrated in IPA and neutralized with 99% acetic acid. The IPA was removed by exposure to hot air and the splits were ground as described in the preceding examples. The protein content was 0.55% in Trial 50 and 0.65% in Trial 51.

Trials 52 and 53 were treated as described above, with the difference that the first washing stage with water was performed only once in the proportions 1:2. The other conditions may be taken from the summary table. It was possible to show that the alkali treatment at 65–70° C. allows more protein to be extracted than that performed at 50–55° C.

In Trial 53 $H_3PO_4$ was used instead of $H_2SO_4$. Less protein was removed, and lower viscosities were obtained.

EXAMPLE VI
Removal of the Peripheral Split Layers as in Example V, Omitting the Washing Step After the Acid Treatment.

After the hydrolysis of the peripheral layers the acidic splits were neutralized with alkaline solutions of varying concentrations. Then an alkali treatment was conducted for 7 minutes at 65–70° C. and the products were washed with water, dehydrated and neutralized, and processed as usual. The effect of the alkali concentration during neutralization influences the final viscosity substantially, as shown below. The lower the NaOH concentration is, the greater the translucency (see Table IV).

In Trial 57 the neutralized splits were treated after the acid treatment with a small quantity of water before the treatment with soda lye was carried out.

The earlier trials showed that moistening the neutralized, acid-treated splits has an influence on the viscosity. For that reason, the trials described below were carried out without this moistening. At the same time the NaOH concentration was varied during the alkali treatment.

In Trials 68 to 73 (Table V) 19% NaOH was used, in Trials 74 to 76 24%, and in Trials 77 to 79 24.4%. In Trials 68 to 73 the alkali treatment lasted 8 minutes, in Trials 74 to 79 10 minutes.

Trial 73 was washed at a higher ratio of split:$H_2O$. An additional washing step was performed at a ratio of 1:4. This additional cleaning delivered a product of higher viscosity.

In Trials 71 to 79 (Table V) the source splits were made alkaline, which exhibited a positive effect on the final viscosity levels.

Trials 78 and 79 show that alkaline dehydration with IPA, followed by neutralization in two steps, destroys the final viscosity.

In Trials 80 and 81 to 85 (Table VI) it was also possible to show that the alkali concentration or a washing step during or after the neutralization of the acidic splits causes a decline in the viscosity.

EXAMPLE VIA

For the Experimental Setup See Example VI, With the Difference That the First Neutralization is Followed by a Moistening Step Trials 60 to 67 (Table V)

Trial 60 was conducted like Trial 57, and yielded a lower viscosity, but higher transparency.

Trials 61 to 63, shown in Table VII, clearly show the positive influence of the quantity of alkali used to remove the protein from the splits.

Trials 64 to 67 show that a longer period of neutralization after the acid hydrolysis of the peripheral layers allows production of guar products of higher viscosity (2790–3075 mPa·s as opposed to 2300 mPa·s)

The cleaned splits (based on 10% moisture) were dissolved in demineralized water at 90° to 100° C. in a 1% concentration, using a household mixer.

EXAMPLE VII

Cleaning the Splits With Concentrated Acid, Alkali Treatment, Washing, and Dehydration and Neutralization Trials 133 to 156

100 g of splits were incubated with 4 g of 5% NaOH for 10 minutes at room temperature. 12 g of 95% $H_2SO_4$ were added and stirred for 7 minutes at room temperature. The reaction took place for 67 minutes at room temperature. 88 g of 23% NaOH were added to Trials 134 to 156 (Summary table), 88 g of 18% NaOH to Trial 133. The mixture was stirred for 3 minutes at 74° C. and the reaction took place for 14 minutes at 85° to 62° C.

Trial 133 was stirred for 3 minutes at 57° C. and allowed to react for 7 minutes at 74° to 64° C.

Two washes were performed, both in the proportions 1:8.3. The first washing phase lasted 15 minutes, the second 10 minutes.

The dehydration and neutralization with IPA took place in the proportions 1:1. Different quantities of acetic acid were used (see overall summary).

A dehydration step was performed with IPA in the ratios 1:0.6, and the remaining IPA was then removed by drying the splits in hot air.

The results are shown in the summary table.

EXAMPLE VIII

Neutralization of the $H_2SO_4$ Used, After Hydrolysis of the Peripheral Layers of the Splits, Employing Various Quantities of 50% NaOH (Under-neutralized, Neutralized and Over-neutralized), Followed by a Washing Step, an Alkali Treatment at Elevated Temperatures and Three Subsequent Washing Steps, Then Dehydration With IPA and Neutralization.

The cleaning conditions and the analytical data for Trials 159 to 161 are gathered together in the summary table.

EXAMPLE IX 100 g of splits were incubated for 10 minutes with 4 g of 5% NaOH. To this were added 12 g of 96% $H_2SO_4$ and the mixture was stirred for 7 minutes and allowed to react at room temperature for 10 minutes. The alkali treatment was carried out with 20 g of NaOH as a 30% solution, based on the 100 g of splits. The treatment occurred for 7 minutes at 53° C. Next a wash was performed with tap water for 5 minutes at a ratio of 1:4 and the splits were recovered by screening. Two washes with tap water were performed for 7 minutes while stirring, and the splits recovered by screening. This was followed by dehydration and neutralization with IPA at a ratio of 1:1, and then recovery of the splits by screening. This was followed by an additional dehydration of the splits with IPA at a ratio of 1:0.6. The remaining IPA was removed with hot air.

In Trials 165 and 166 ethanol was used instead of IPA. High concentrations of sodium acetate were found.

Trials 167 and 168 were treated with KOH as an alkaline solution, in order to investigate the solubility of potassium acetate in IPA. No significant difference from sodium acetate could be found.

In Trials 169 and 170 additional variations of this process were investigated. The slightly alkaline splits were incubated for 30 minutes at 100° C. in Trial 169 and at 80° C. in Trial 170, also for 30 minutes. Treatment with 12.4 g of 96% $H_2SO_4$ followed (see summary table).

EXAMPLE X

Over-neutralization of the Acid-treated Splits With 10% NaOH, After Which They Were Treated With Hot 30% NaOH for 25 to 29 Minutes at 65° to 69° C., Then Dehydrated and Neutralized.

Products with protein contents of approximately 0.5%, high viscosities and high degrees of transparency can be produced in accordance with example VIIIB.

EXAMPLE XI

Treatment of the Splits With Concentrated Sulfuric Acid at Room Temperature, Neutralization With 10% Soda Lye, Alkali Treatment of the Splits With 23% Soda Lye, Washing of the Splits, Addition of 1.600 kg IPA, Grinding of the Splits, Neutralization With $H_3PO_4$, Grinding, Dehydration With 1.000 kg IPA, Drying.

To 1.000 kg of splits of the highest quality was added 0.120 kg of $H_2SO4$ at room temperature over a period of 7 minutes; this was mixed and left to stand at room temperature for 60 minutes. 1.000 kg of 10% NaOH was added to neutralize the sulfuric acid, while maintaining a temperature of >53° C., and the mixture was mixed for 10 minutes at a temperature of 53° to 63° C. 0.900 kg of 23% NaOH was added while a temperature of 78° C. was reached; this was mixed and left standing for 20 minutes at 70° to 75° C. with occasional stirring. Next three washings were performed, each for 7 minutes with 7.000 kg of tap water at room temperature. 1.600 kg of IPA was added, and the splits thus treated were ground for 5 minutes in a colloid mill. After neutralization with 85% $H_3PO4$ the mixture was ground for 10 additional minutes and the deposit was filtered over 45 μm gauze. 1.000 IPA was added and stirred vigorously for 7 minutes. The resulting guarseed flour was dried. The viscosity of a 1% solution, measured in a Brookfield RVT viscometer at 25° C., was 7900 mPa·s, the transparency of a 0.5% solution measured in a photometer was 89.0%, the protein content was 0.43% and the A.I.R. content was 0.71%.

EXAMPLE XII

Partially Depolymerized Pure Guarseed Flour
Treatment of the Splits With $H_2SO_4$ at 105° C., Neutralization With 30% Soda Lye, Washing, Alkali Treatment With 30% Soda Lye, Washing, Dehydration and Neutralization.

1.000 kg of splits was treated with 0.060 kg of 96% $H_2SO_4$ for 18 minutes at 105° C. 0.157 kg of 30% NaOH was added for neutralization and the mixture was incubated for 2 minutes at room temperature. Next the splits were washed for 2 minutes at room temperature with 2.000 kg of tap water. To partially deproteinize the splits, 1.060 kg of 30% NaOH was added, the mixture was stirred for 4 minutes, and then allowed to react for 7 additional minutes at 65–70° C. The splits were then washed with 2.4 kg of tap water for 6 minutes at room temperature, after which once again 10 kg of tap water were added and the mixture was incubated for 5 minutes at room temperature in order to moisten the splits. 1.6 kg of 99% water-free IPA was added, incubated for 15 minutes at 55–62° C., and then treated with 0.066 kg of 99% acetic acid. The splits were ground with a hammer mill.

The viscosity, measured as described earlier, was 60 mPa·s for a 1% solution, the translucency was 94% and the protein content was 0.65%.

EXAMPLE XIII

Partially Depolymerized Pure Guarseed Flour With Extremely Low Protein Content and Aqueous Solutions of Excellent Clarity The splits (1 kg) are treated for 60 minutes with 8% by weight of 96% $H_2SO_4$ at room temperature and then treated first with 670 g of 10% soda lye followed by 1.060 kg of 30% soda lye. In Trial C (see table) the splits were treated for 20 minutes with 50% soda lye at 67° C. The splits were washed for two 2-minute period with tap water in the proportions 1:5 and one time for 6 minutes with tap water in the proportions 1:8. The splits were dehydrated with 1.4 kg of 99% isopropanol and the cleaned splits were then ground in a colloid mill.

The suspension was left standing for sedimentation to occur, and after 15 minutes 4.0 to 4.6 liters of the top liquid were decanted, after which 1.1 kg of 99% IPA was again added. The suspension was heated to 60° to 65° C. in a reflux vessel and this temperature was held constant for 2 hours.

A further addition of 1.2 kg of 99% IPA makes dehydration easier. The alkaline products were neutralized with 36 to 60 g of 99% acetic acid and brought to the desired fineness by being wet ground again in a colloid mill. The products were recovered by filtration and subsequent drying of the "wet" filtrate at 70° C. In Trial C 10 ml of 30% $H_2O_2$ was added to accelerate the depolymerization during the alkaline treatment in the water/IPA suspension.

The following results were obtained:

|  | Product | | |
| --- | --- | --- | --- |
|  | A | B | C |
| Yield in g | 792 | 735 | 725 |
| Water content % | 9.6 | 11.2 | 6.8 |
| 1% viscosity mPa 5.20 UpM Measured temp. 25° C. | | | |

-continued

|  | Product | | |
| --- | --- | --- | --- |
|  | A | B | C |
| Solution 1 | 1250 | 850 | 35 |
| Solution 2 | 1650 | 900 | 35 |
| 0.5% transmission 1 cm cuvette/500 nm | | | |
| Solution 1/water 1:1 | 85.1 | 87.0 | 92.0 |
| Solution 2/water 1:1 | 96.0 | 95.8 | 97.2 |
| Protein % Nx 6.28 | 0.25 | 0.23 | 0.31 |

Solution 1 was produced at 25° C. and solution 2 at 90° C. in a mixer and then cooled to 25° C.

EXAMPLE XIV 10 kg of splits were treated at 35 to 40° C. with 1 kg of 96–98% $H_2SO_4$ for 1 hour, and the precipitated material was stirred at intermittent intervals for 30 seconds at a time. The treated splits were then neutralized with 1.64 kg of 50% NaOH, which causes a rise in temperature to 50° to 70° C. After 15 minutes the neutralized splits were washed twice for 2 to 3 minutes with tap water in the proportion of splits to tap water of 1:5, and then once again for 6 minutes in proportion of splits to tap water of 1:8. The wash water was suctioned off in each case. The cleaned splits take on 80 to 82% water during the washing process. The strongly hydrated splits were ground in a hammer mill with a capacity of 30 kg/h during suctioning of hot air at approximately 110° C., so that the product could be dried in the same working step.

The products produced in this manner exhibit viscosity values between 5000 and 8350 mPa·s in aqueous solution at a concentration of 1% based on a water content of 10% of the ground product. The solutions were produced as described earlier, in a household mixer with hot water at 90° C.

The clarity of the aqueous solutions, thinned at 1:1, measured at a layer thickness of 1 cm, was 1–67.5%.

The products produced in this manner can be converted to nearly water-clear products when dissolved in water, in a second process with 8–10% NaOH (based on the starting weight of the splits) in aqueous IPA (35 percent by weight) at 65° to 70° C. and subsequent washing with aqueous IPA.

The purified alkaline product was neutralized with acetic acid; depending upon the conditions during washing these products can contain up to 12% sodium acetate.

EXAMPLE XV

In the following section various processes are described, by analogy with the earlier examples, which furnish pure guarseed flour for technical applications.

A. Splits washed with water and treated with acid are subjected to a subsequent alkali treatment at various temperatures and reaction times, depending upon the specificity of the final product. After the alkali treatment the splits are washed with water in order to remove the decomposition products of the alkali treatment as well as dissolved proteins and alkali.

Washing without borax leads to water levels of up to 85% of the treated splits. These severely swollen splits are dehydrated with aqueous IPA, and after partial dehydration are neutralized (about 5 minutes after addition of the aqueous IPA).

The partially dehydrated splits can be wet ground in a colloid mill, recovered by filtration, and further processed.

B. The splits are treated as described in A, but the alkali treatment, either of the splits or as a coarsely ground wet product, takes place in a filtration and washing unit for 1 hour at 70° C. This treatment is followed by extraction with aqueous IPA, neutralization and dehydration, likewise by means of aqueous IPA. The moist cake obtained after this treatment can be dried and further processed into the appropriate end product according to the requirements.

C. The treatment of the splits is the same as described in B., but the addition of $H_2O_2$ yields a pure guarseed flour of low viscosity. This leads to an improvement in the clarity of the solution of the end products.

D. The treatment of the splits is the same as described in A., but using reagents such as sodium monochloracetate or glycidyl trimethyl ammonium chloride to produce anionic or cationic products of great clarity. These reagents are placed in a reaction vessel after the product has run through the filtration and washing unit (see B).

The moist cake of pure guar gum is dried in a rotary drier with hot air at 80° C. The dried products are pulverized to the desired size and then packaged.

Additional examples to illustrate the invention may be found in the accompanying tables, starting on page 11.

What is claimed is:

1. A process for producing a non-derivatized polygalactomannan guarseed flour, having a viscosity of 45 to 10,000 mPa·s as a 1% aqueous solution, a content of proteins and acid non-hydrolyzable substances of 0.8 to 0.9%, and a transparency of at least 70% when measured as a 0.5% aqueous solution at a wavelength of 500 nm, said process consisting essentially of the steps of:

(a) treating guar splits with an acid;
    (b) washing said acid-treated splits one or more times with water and/or neutralizing said acid-treated splits with a first aqueous alkaline solution;
    (c) treating said splits with a second aqueous alkaline solution;
    (d) washing said splits with water; and
    (e) dehydrating said splits with an aqueous alcohol solution.

2. The process according to claim 1, wherein said acid used in step (a) is concentrated sulfuric acid in a concentration ranging from 70% to 96% of an aqueous solution and in an amount ranging 5% to 20% by weight of said splits.

3. The process according to claim 2, wherein said sulfuric acid is in a concentration of 96% of an aqueous solution and in an amount ranging 8% to 12% by weight of said splits.

4. The process according to claim 1, wherein said sulfuric acid used in step
    (a) is in a concentration lower than 70% of an aqueous solution.

5. The process according to claim 1, wherein said first aqueous alkaline solution is an aqueous soda lye solution.

6. The process according to claim 1, wherein said first alkaline solution used to treat the neutralized split is soda lye at a concentration ranging 20% to 40% by weight of said splits.

7. The process according to claim 1, wherein said second aqueous alcohol solution is selected from the group consisting of: methanol; ethanol; and isopropyl alcohol.

8. The process according to claim 1, further comprising the step of neutralizing said splits with a solution of an organic acid.

9. The process according to claim 1, further comprising the step of moistening said splits which were dehydrated with an aqueous alcohol solution, to achieve a moisture level ranging 60% to 80%.

10. The process according to claim 1, wherein said splits have a protein content of 4.2% by weight and have a level of acid non-hydrolyzable substances at 1.8% by weight.

11. The process according to claim 1, wherein the guarseed flour yield of from about 70 to 80%.

12. The process according to claim 1, wherein the guarseed flour has a transparency of 94% as a 0.5% solution at a wavelength of 500 nm.

* * * * *